July 27, 1943.　　　KARL B KILBORN　　　2,325,204
METHOD AND APPARATUS FOR VULCANIZING BELTS
Filed Nov. 4, 1941　　　2 Sheets-Sheet 1

Inventor
Karl B. Kilborn
By
Attorney

July 27, 1943.    KARL B KILBORN    2,325,204
METHOD AND APPARATUS FOR VULCANIZING BELTS
Filed Nov. 4, 1941    2 Sheets—Sheet 2
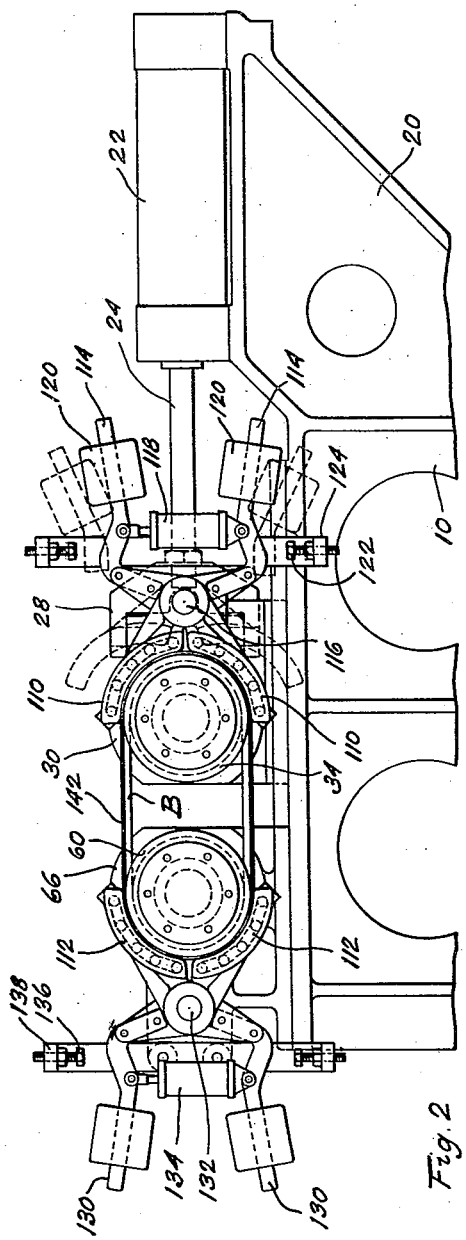
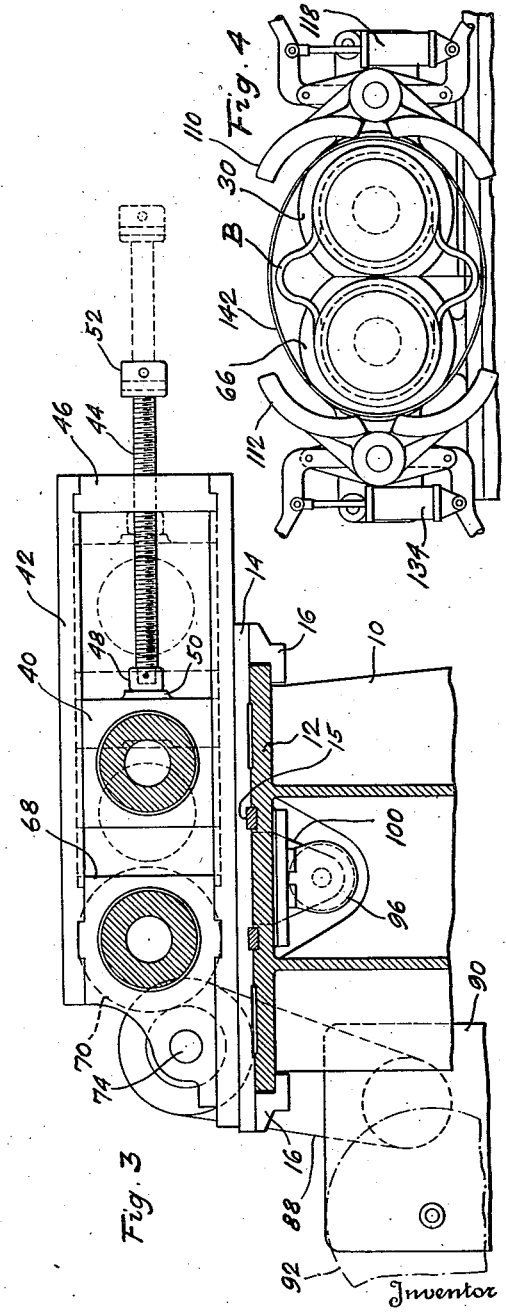
Fig. 2  Fig. 3  Fig. 4
Inventor
Karl B. Kilborn
By
Attorney Patented July 27, 1943

2,325,204

UNITED STATES PATENT OFFICE 2,325,204

METHOD AND APPARATUS FOR VULCANIZING BELTS

Karl B Kilborn, Akron, Ohio, assignor to Wingfoot Corporation, Akron, Ohio, a corporation of Delaware Application November 4, 1941, Serial No. 417,790

11 Claims. (Cl. 18—6)

This invention relates to methods and apparatus for vulcanizing rubber material, and more particularly is concerned with means and methods for vulcanizing relatively wide endless rubber sheet material and for vulcanizing a plurality of endless V- or other narrow belts side by side and simultaneously.

The general object of my invention is provision of improved means and methods for rapidly and efficiently vulcanizing endless rubber sheet material, and particularly V-belts and the like.

Another object of my invention is to provide methods and apparatus for vulcanizing belts or other endless rubber sheet material and whereby the belts or sheet material are vulcanized at a minimum cost and to the exact overall length required.

Another object of my invention is the provision of methods and apparatus whereby belts and rubber sheet material of endless character are expanded into engagement with a flexible and inextensible member and with vulcanizing heat being applied to the rubber through both its inner and outer periphery.

The foregoing and other objects of my invention are achieved by the provision of apparatus comprising an endless flexible member, collapsible means directly engaging the inner periphery of the rubber material to be vulcanized for forcing the material outwardly into pressure engagement with the flexible member, and means for supplying vulcanizing heat to the inner and outer peripheries of the rubber material.

Stated in terms of method, one embodiment of my invention includes the steps of vulcanizing endless rubber material, such as belts, to an exact length by stretching the material to the exact and desired length, flexibly but inextensibly confining the material by engagement with its outer periphery, supporting the inner periphery of the material only at spaced points, passing vulcanizing heat to the inner and outer peripheries of the material and moving the material in an endless path during the vulcanizing operation.

Before proceeding with a detailed description of the apparatus, it might be noted that the form of my invention described in greatest detail herein includes a pair of drums mounted with their axes parallel and adapted to carry, substantially as head and tail pulleys, the belt or belts to be vulcanized. The drums are adapted to be moved apart to stretch the belt or belts into engagement with the inner periphery of an endless flexible and inextensible pressure band. Also, the drums are adapted to be moved simultaneously and in a direction parallel to their axes so as to position the drums either in a vulcanizing position within the pressure band or in a loading and unloading position outside the pressure band.

For a better understanding of my invention reference should be had to the accompanying drawings wherein:

Fig. 2 is a fragmentary side elevation of the apparatus shown in Fig. 1 and with the apparatus being illustrated in expanded or vulcanizing position;

Fig. 3 is a transverse vertical cross-sectional view taken on line III—III of Fig. 1;

Fig. 4 is a view similar to Fig. 3, with certain of the parts shown in Fig. 3 being broken away, and with the apparatus being illustrated in the contracted or loading and unloading position;

Fig. 5 is a longitudinal transverse cross-sectional view through a modified form of apparatus embodying the principles of my invention;

Fig. 6 is an end elevation of the apparatus illustrated in Fig. 5;

Fig. 7 is a view similar to Fig. 5 and illustrating still another form of the invention; and Fig. 8 is a transverse cross-sectional view taken on line VIII—VIII of Fig. 7.

Figure 1:
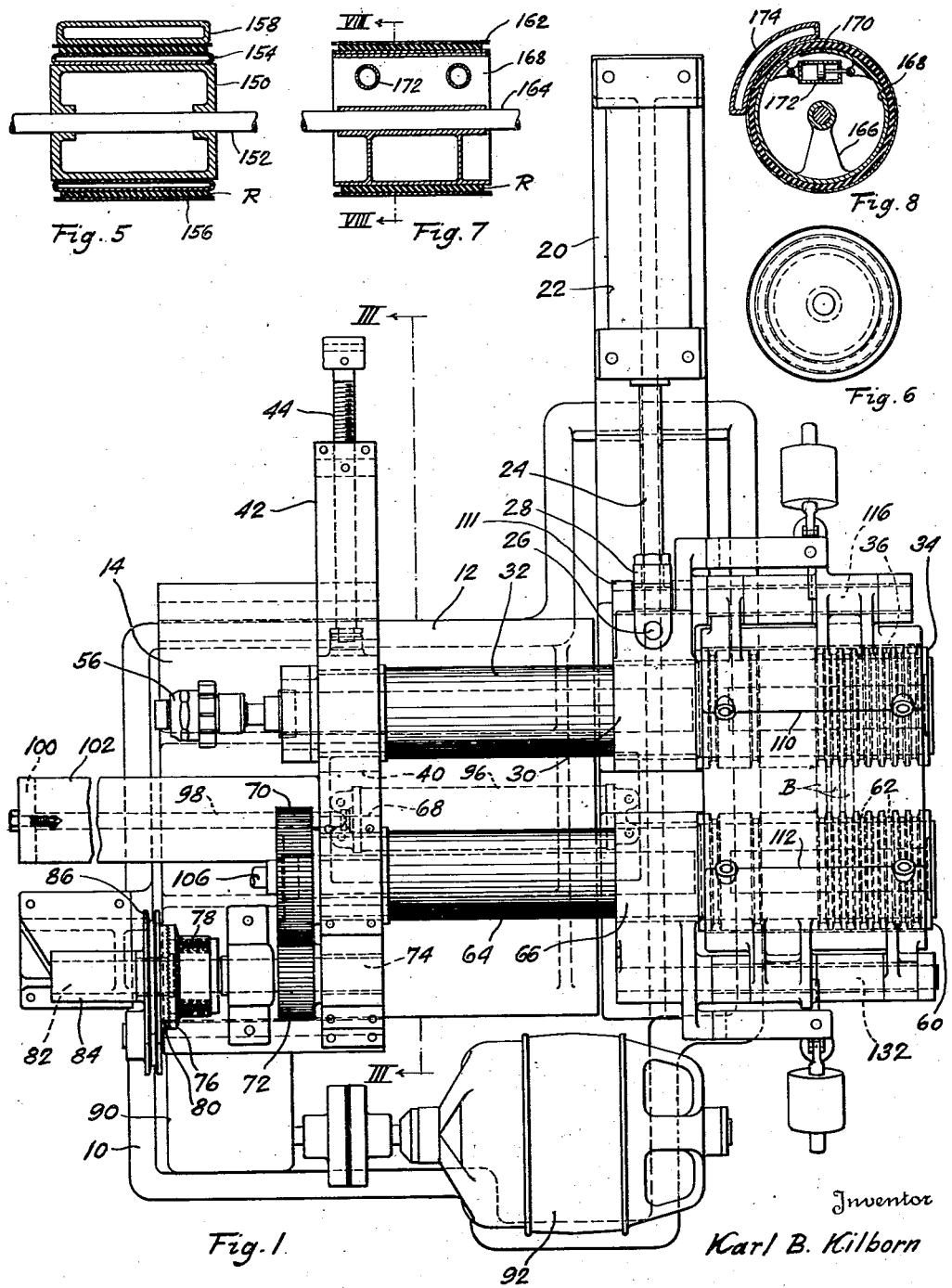
Fig. 1 is a plan view of one embodiment of the invention.

The principles of my invention are broadly applicable to the vulcanization of rubber material in a variety of forms and particularly endless rubber sheet material such as conveyor belts, relatively narrow motor drive belts, bands, and the like, but my invention is particularly adapted to methods and apparatus for vulcanizing endless V-belts, and has accordingly been so illustrated and will be so described.

Referring to Figs. 1 to 4 of the drawings, the numeral 10 indicates a base having a flat top 12 which slidably receives a plate 14 for lateral movement in guided relation to the base 10 which may be achieved by the provision of keys 15 and gibs 16 which are secured to the plate 14 and engage under the overhanging edge of the top 12. The base 10 has an integral outrigger bracket 20 associated therewith which supports a fluid pressure motor 22 having a piston rod 24 extending over the top of the base 10 and pivotally secured as at 26, and by a clevis 28 to a bearing block 30 slidably carried on the top 12 of the base 10.

The bearing block 30 rotatably supports a hollow shaft 32 which carries a drum 34 which is provided with a plurality of laterally-spaced, circumferentially-continuous grooves 36 which are adapted to receive a plurality of V-belts B which are to be vulcanized in the apparatus. The end of the shaft 32 remote from the drum 34 is journaled rotatably in a bearing block 40 which is mounted for movement in a frame 42 from the full line to the dotted line positions illustrated in Fig. 3. The frame 42 is carried by the plate 14. The outermost position that the block 40 can move in the frame 42 is adjustably limited by a threaded shaft 44 adjustably carried in a suitably tapped opening in the end 46 of the frame 42. The threaded shaft 44 has a rotatable cap 48 on its end which engages with a suitable pad 50 usually formed integrally with the bearing block 40. A head 52 is secured to the end of the threaded shaft 44 so that a bar or wrench can be associated with the head to rotate the threaded shaft 44 to the position desired. Steam or other hot fluid may be circulated through the hollow shaft 32 and the drum 34 in any known or suitable manner, as for example by provision of conduits 56.

Cooperating with the drum 34 is a drum 60 which is formed on its outer surface with a plurality of laterally-spaced, circumferentially-continuous grooves 62 which are adapted to receive the V-belts B and it will be understood that the grooves 62 and 36 are in alignment with each other. The drum 60 is carried on one end of a hollow shaft 64 which is rotatably mounted in a suitable bearing block 66 secured to the top 12 of the base 10. The end of the hollow shaft 64 remote from the drum 60 is rotatably journaled in a bearing block 68 rigidly carried in the frame 42 at one end thereof.

The drums 34 and 60 are adapted to be rotated during the vulcanizing operation and this is ordinarily accomplished by merely driving one drum and effecting rotation of the other drum through the belts being vulcanized. In the embodiment of my invention illustrated I provide for the rotation of the drum 60 by securing a gear 70 to the end of the hollow shaft 64 remote from the drum 60, which gear engages with a pinion 72 carried on a jack shaft 74 supported in bearings carried by the plate 14. The jack shaft 74 has a clutch plate 76 splined at its end remote from the pinion 72 and normally held outwardly of the jack shaft by springs 78. The face of the clutch plate 76 is formed with laterally extending ribs or teeth which are adapted to cooperate with similar teeth formed on the adjacent face of a clutch plate 80 carried on the side of a pulley 86 which is journaled on a stud shaft 82 fixed in a bearing 84 mounted on the top 12 of the base 10. The pulley 86 is driven by a belt 88 from a gear box 90 to which an electric motor 92 or other prime mover is connected.

The drive for the drum 60 as just described includes the clutch plates 76 and 80 for the reason that the drums 34 and 60 are adapted to be moved laterally of the base 10 from a vulcanizing position to a loading and unloading position. This is achieved by the provision of a fluid pressure cylinder 96 which is secured at one end to the base 10 and the piston rod 98 of the pressure cylinder is secured to a downwardly extending bracket 100 carried on the end of a cantilever arm 102 secured to the plate 14. Thus, with the apparatus in the position shown in Fig. 1 of the drawings, the drive from the motor 92 to the drum 60 is in engagement and rotation of the drums during vulcanization of the belts can be achieved. When vulcanization is complete the pressure cylinder 96 is operated to move the plate 14, frame 42, the hollow shafts 32 and 64, and the drums 34 and 60 to the right of Fig. 1 to fully uncover the drums so that the vulcanized belts can be removed therefrom and unvulcanized belts mounted thereon. It will be understood that steam or other vulcanizing fluid is supplied to the interior of the drum 60 during the vulcanizing operation by conduit means 106.

Associated with the drums 34 and 60 when in the vulcanizing position are arcuately shaped shoes 110 and 112. The shoes 110 comprise a pair which are adapted to substantially surround 180° of the drum 34 with the shoes 110 having backwardly extending arms 114 which are pivotally secured together in scissorlike relation upon a shaft 116. A fluid pressure cylinder 118 is pivotally secured between the arms 114 so that upon operation of the fluid pressure means the arcuate shoes 110 can be moved from the full line position shown in Fig. 2 to the dotted line position shown in the same figure or to the full line position shown in Fig. 4. Weights 120 adjustably positioned on the arms 114 may be employed to counterbalance the weight of the arcuate shoes 110. Adjustable stops 122 carried by suitable brackets 124 may be provided to ensure a balanced opening action of the shoes 110 under the influence of the pressure cylinder 118. The shaft 116 which pivotally supports the shoes 110 is carried by suitable lugs 111 on the bearing block 30 to which the clevis 28 is attached and the shaft 116 is positioned a sufficient distance from the drum 34 so that the opening movement of the shoes 110 provides a sufficient clearance between the shoes and the surface of the drum so that V-belts B can be readily slipped into or removed from the grooves 36 in the periphery of the drum.

The arcuate shoes 112 have rearwardly extending arms 130 which are pivotally mounted upon a shaft 132 carried by the bearing block 66. A fluid pressure cylinder 134 pivotally secured to the arms 130 function to move the shoes from the position shown in Fig. 2 to the position shown in Fig. 4, as will be understood. Adjustable stops 136 carried upon a suitable bracket 138 function to cause the shoes 112 to open substantially the same radial distance from the drum 60.

Associated with the arcuate shoes 110 and 112 is a flexible and inextensible pressure band 142, which is usually made of a high strength flexible steel strip and which is adapted to closely engage with the outer periphery of the belts B during the vulcanizing operation as seen in Fig. 2, and which is adapted to spring outwardly to the position shown in Fig. 4 during the loading and unloading operation of the apparatus.

Briefly reviewing the operation of the apparatus, the fluid pressure cylinder 22 is energized to move the bearing block 30 towards the bearing block 66 and simultaneously move the shaft 32 and drum 34 towards the shaft 64 and the drum 60. The bearing block 40 supporting the end of the shaft 32 remote from the drum 34 moves with the shaft 32 so that the drums 34 and 60 are positioned relatively close together, and in the manner shown in Fig. 4. The fluid pressure cylinders 118 and 134 are energized to open the arcuate shoes 110 and 112 so that the pressure band 142 takes the position shown in Fig. 4. Fluid pressure cylinder 96 is energized to move the plate 14 laterally of the top 12 of the base 10 to thereby move the drums 34 and 60 out from within the pressure band 142 and from a position within the arcuate shoes 110 and 112. With the drums in this position a plurality of unvulcanized V-belts B may be readily positioned over the drums and so as to be carried by the grooves 36 and 62 of the drums. After all of the grooves of the drums have been filled with V-belts, it being understood that each belt is engaged in one of the grooves 62 and in an aligned groove 36, the pressure cylinder 96 is energized in the reverse direction to move the plate 14 laterally and bring the drums 34 and 60 within the pressure band 142 and within the shoes 110 and 112. Thereafter, the pressure cylinder 22 is energized in the reverse direction to pull out very strongly on the shaft 32 and the drum 34 to thereby stretch the belts B snugly down into the grooves which receive them. This stretching action continues until the outer peripheries of the belts engage with the inner periphery of the pressure band 142 at which time the belts are stretched to exactly the overall length desired or required for use. The stretching of the belts B, while carried in cantilever relation on the drums 34 and 60 is readily achieved for the reason that the bearing block 40 carrying the end of the shaft 32 remote from the drum 34 engages with the threaded shaft 44 which acts as a positive stop for the bearing block 40. The point of engagement of the bearing block 40 with the threaded shaft 44 may be adjusted to position the shafts 32 and 64 in exactly parallel relation when the belts B are properly tensioned. Thus, the cantilever support for the drum 34 is relatively strong and very considerable stretching pressures can be applied to the drum 34 by the fluid pressure cylinder 22. Accordingly, the outer peripheries of the belts B are held under relatively heavy pressure against the inner periphery of the pressure band 142 during the vulcanizing operation.

After the belts B are stretched, as just described, into engagement with the pressure band the arcuate shoes 110 and 112 are moved into engagement with the outer periphery of the pressure band 142 by suitably energizing the fluid pressure cylinders 118 and 134, and the vulcanizing operation is ready to proceed. Vulcanization is achieved by passing steam or other vulcanizing fluid to the interior of the drums 34 and 60 and to the interior of the arcuate shoes 110 and 112 which are appropriately recessed to receive such a vulcanizing fluid. The motor 92 is energized either prior to or concurrently with the passage of vulcanizing fluid to the apparatus and the motor 92 rotates the drum 60 and through the belts B the drum 34 to continuously pass the belts B over the vulcanizing drums in a manner which will be evident. After vulcanization has proceeded the requisite length of time and to completion the apparatus is returned to its initial contracted or unloading position by reversing the operations above described.

In the modification of my invention illustrated in Figs. 5 and 6, I provide a drum 150 which may be suitably supported upon a shaft 152 and which carries a relatively wide endless airbag 154 on the periphery of the drum 150. The airbag is adapted to receive a relatively wide endless layer or sheet of rubber material R and over the outer surface of the rubber material R an endless flexible pressure band 156 is adapted to be slipped. With the parts in the position shown in Fig. 5 air or other fluid is supplied to the interior of the airbag 154 to force the rubber material R out into very firm pressure relationship with the inner periphery of the pressure band 156.

Vulcanization of the rubber may be achieved in various ways, for example, the assembly thus provided may be placed in a steam chamber. Again, if desired, steam or other vulcanizing fluid may be supplied to the interior of the airbag 154, and arcuate shoes 158 may be moved into engagement with the outer periphery of the pressure band 156 which shoes are suitably apertured for the reception of steam or other vulcanizing fluid and vulcanization of the rubber material R can be achieved from the shoes 158 and the vulcanizing fluid passed to the airbag 154. The drum 150 may be rotated or not as desired during the vulcanizing operation. After vulcanization has been completed the airbag 154 is deflated and the rubber material can be stripped from the airbag and removed from within the pressure band 156.

In the form of my invention illustrated in Figs. 7 and 8, I provide an endless flexible pressure band 162 against the inner periphery of which rubber material R is adapted to be forced by suitable mechanical means. Such means comprise a collapsible and expansible drum which may take a variety of forms as will be understood by those skilled in the art, but which conveniently comprises a shaft 164 supporting through spokes 166 a cylindrical metal shell 168 having overlapping ends 170, the radially outer end being provided with a very thin feather edge. The overlapping ends 170 of the metal cylinder 168 are adapted to be moved from an expanded position to a collapsed position, as for example by the provision of fluid pressure cylinders 172, several of which may be positioned along the cylinder.

In the operation of this form of my invention the metal cylinder 168 will be collapsed by operation of the pressure cylinders 172, the rubber material R will be built or will be slipped on the cylinder, the pressure band 162 will be slipped over the rubber material, and the pressure cylinders 172 operated in a reverse direction to expand the cylinder and stretch the rubber material R into very firm pressure engagement with the inner periphery of the pressure band. Vulcanization may be completed by positioning the whole drum in a steam chamber, or by providing arcuate shoes 174 which engage with the outer periphery of the pressure band and to which steam may be supplied to complete vulcanization, upon rotation of the assembly.

From the foregoing it will be recognized that the various objects of my invention have been achieved by the provision of improved means and methods for rapidly, efficiently and relatively inexpensively vulcanizing belts and other endless rubber sheet material to exactly the desired length. Loading and unloading of the apparatus is a relatively simple procedure, stretching of the material prior to vulcanization, and the holding of the material strongly against the inner periphery of an endless and inextensible pressure band during the vulcanization is facilitated.

While in accordance with the Patent Statutes I have specifically illustrated and described my invention it should be understood that I am not to be limited thereto or thereby but that the scope of my invention is defined in the appended claims.

I claim:

1. Apparatus for vulcanizing endless rubber belts, sheet material, and the like, said apparatus comprising a relatively wide, endless, flexible, inextensible band, collapsible means positioned inside of the band and adapted to engage the inner periphery of rubber material to be vulcanized and adapted to force it outwardly into pressure engagement with the band, and means adapted to supply vulcanizing heat to the rubber material.

2. Apparatus for vulcanizing endless rubber belts, sheet material, and the like, and comprising a wide, endless, inextensible, flexible member, a wide substantially flat drum adapted to be received within the member, a wide substantially flat airbag carried by the drum so as to provide a space between the airbag and the member to receive the material to be vulcanized, said airbag being adapted to be expanded to force the material into engagement with the member, and means for heating the material to vulcanize the same.

3. Apparatus for vulcanizing endless rubber belt and sheet material and comprising an endless flexible member, a circumferentially expansible drum positioned inside of the member so as to provide a space between the member and the drum adapted to receive the material to be vulcanized, said drum including arcuately movable overlapping ends the radially outer of which terminates in a feather edge, and means for effecting relative arcuate movement between the ends to force material received between the drum and member into engagement with the member, and means for vulcanizing the material.

4. Apparatus for vulcanizing endless rubber belt and sheet material and comprising an endless flexible member, a pair of drums positioned within the endless flexible member and mounted with their axes parallel and for movement towards and from each other and adapted to carry the material as head and tail pulleys, means for moving the drums together to allow the material to be positioned over the drums within the member and for moving the drums apart to force the outer periphery of the material into endless engagement with the complete inner periphery of the member, means for supplying heated fluid to the material, and means for rotating the drums.

5. Apparatus for vulcanizing endless rubber belt and sheet material and including a pair of drums adapted to receive and carry the material substantially as head and tail pulleys, a pair of shafts mounting the drums at one end, a base, bearings on the base journalling the shafts adjacent the drums, a plate slidably mounted on the base, bearings on the plate journaling the other ends of the shafts, means for moving the plate to position the drums adjacent the base in vulcanizing position or in a loading position spaced laterally of the base, means for rotating one shaft and operative only with the drums in vulcanizing position, an endless pressure band surrounding the drums when in vulcanizing position, means for moving one shaft and its bearings laterally of the other shaft to tighten the drums against the pressure band, means removably engaged with the outside of the pressure band for supplying vulcanizing heat thereto, and means for supplying vulcanizing heat to the inside of the drums.

6. A vulcanizing apparatus including a pair of drums, means for moving the drums to and from each other, means for rotating a drum about its axis, an endless flexible pressure band surrounding the drums and adapted to rotate therewith in the vulcanizing position of the drums, means engaging with the band to supply heat therethrough to vulcanizable material carried jointly by the drums, means for supplying heat to the interior of a drum, and means for effecting relative movement of the drums axially from a vulcanizing position within the pressure band to a loading and unloading position remote from the pressure band.

7. A vulcanizing apparatus including a pair of drums, means for moving the drums to and from each other with their axes substantially parallel, means for rotating a drum about its axis, an endless flexible pressure band surrounding the drums, means for supplying heat to the interior of a drum, and means for effecting relative movement of the drums axially from a vulcanizing position within the pressure band to a loading and unloading position remote from the pressure band.

8. A V-belt vulcanizing apparatus including a pair of drums having a plurality of belt receiving grooves, means for moving the drums to and from each other with their axes substantially parallel, means for rotating a drum about its axis, an endless flexible pressure band surrounding the drums and adapted to rotate therewith in the vulcanizing position, means engaging with the band to supply heat therethrough to belts carried by the grooves, and means for supplying heat to the interior of a drum.

9. A vulcanizing apparatus including a pair of drums, means for laterally moving the drums to and from each other, means for rotating a drum about its axis, an endless flexible pressure band surrounding the drums and adapted to rotate therewith in the vulcanizing position, means engaging with the band to supply heat therethrough to vulcanizable material carried jointly by the drums, and means for supplying heat to the interior of a drum.

10. A vulcanizing apparatus including a pair of drums, means for moving the drums laterally to and from each other, means for rotating a drum about its axis, an endless flexible pressure band surrounding the drums, and means for effecting relative axial movement between the pressure band and the drums to position the drums within or outside of the pressure band.

11. The method of vulcanizing endless rubber material, such as belts, to an exact length which comprises supporting the material at spaced points on its inner periphery, moving the supporting points apart to stretch the material, limiting the movement apart of the supporting points by flexibly and inextensibly confining the outer periphery of the material when the movement apart of the supporting points has brought the material length to exactly that desired, subjecting the inner and outer peripheres of the material to the action of vulcanizing heat, and passing the material in an endless path during the time it is subjected to vulcanizing heat.

KARL B KILBORN.